W. NORTHROP.
FRUIT CLEANING MACHINE.
APPLICATION FILED FEB. 9, 1911.
1,068,004.
Patented July 22, 1913.
2 SHEETS—SHEET 1.
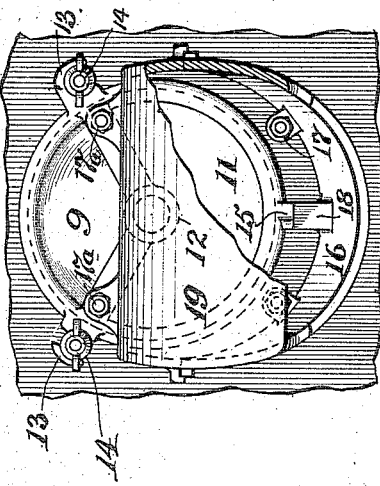
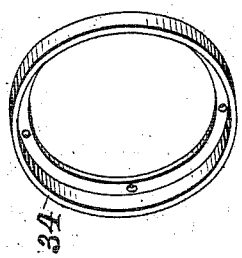
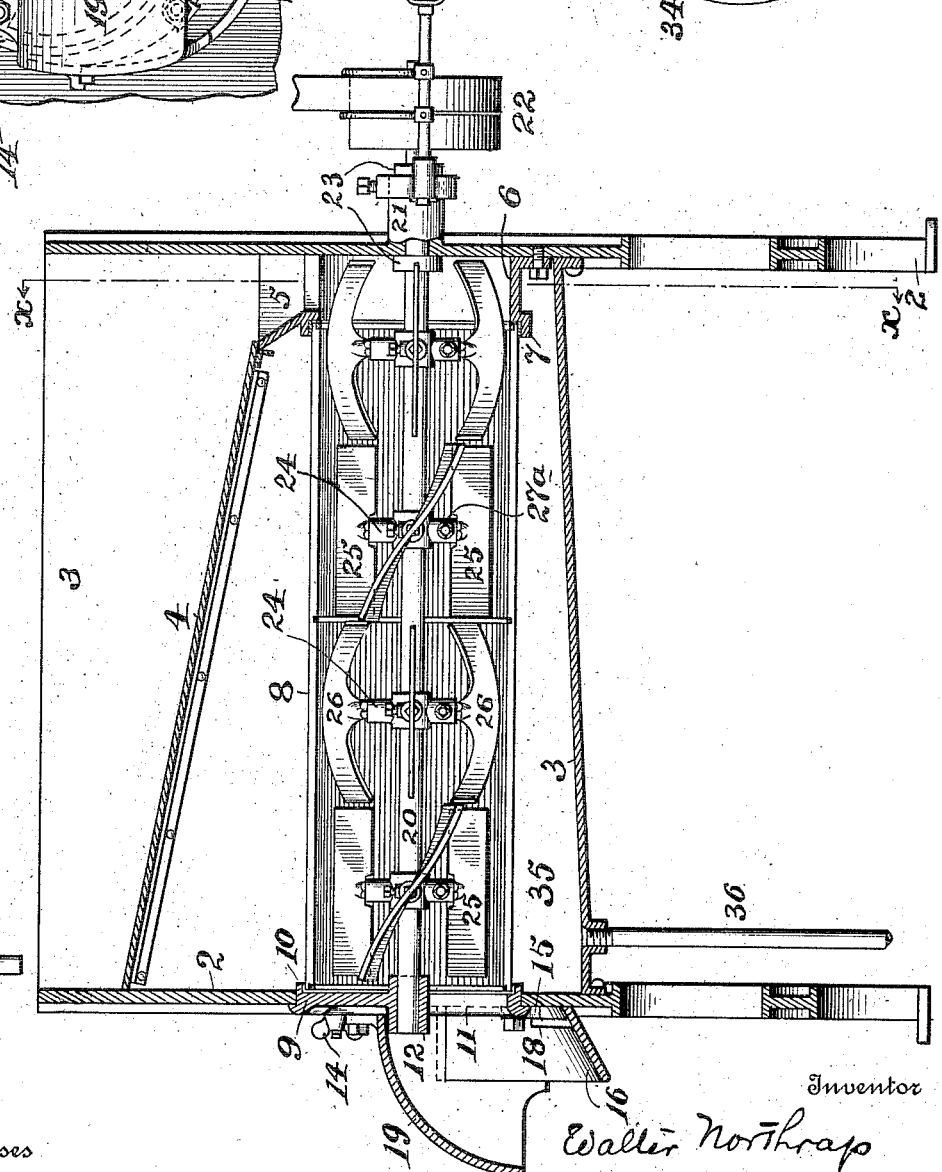
Witnesses
Daniel Webster, Jr.
R. M. Kelly
Inventor
Walter Northrop
By
Attorney

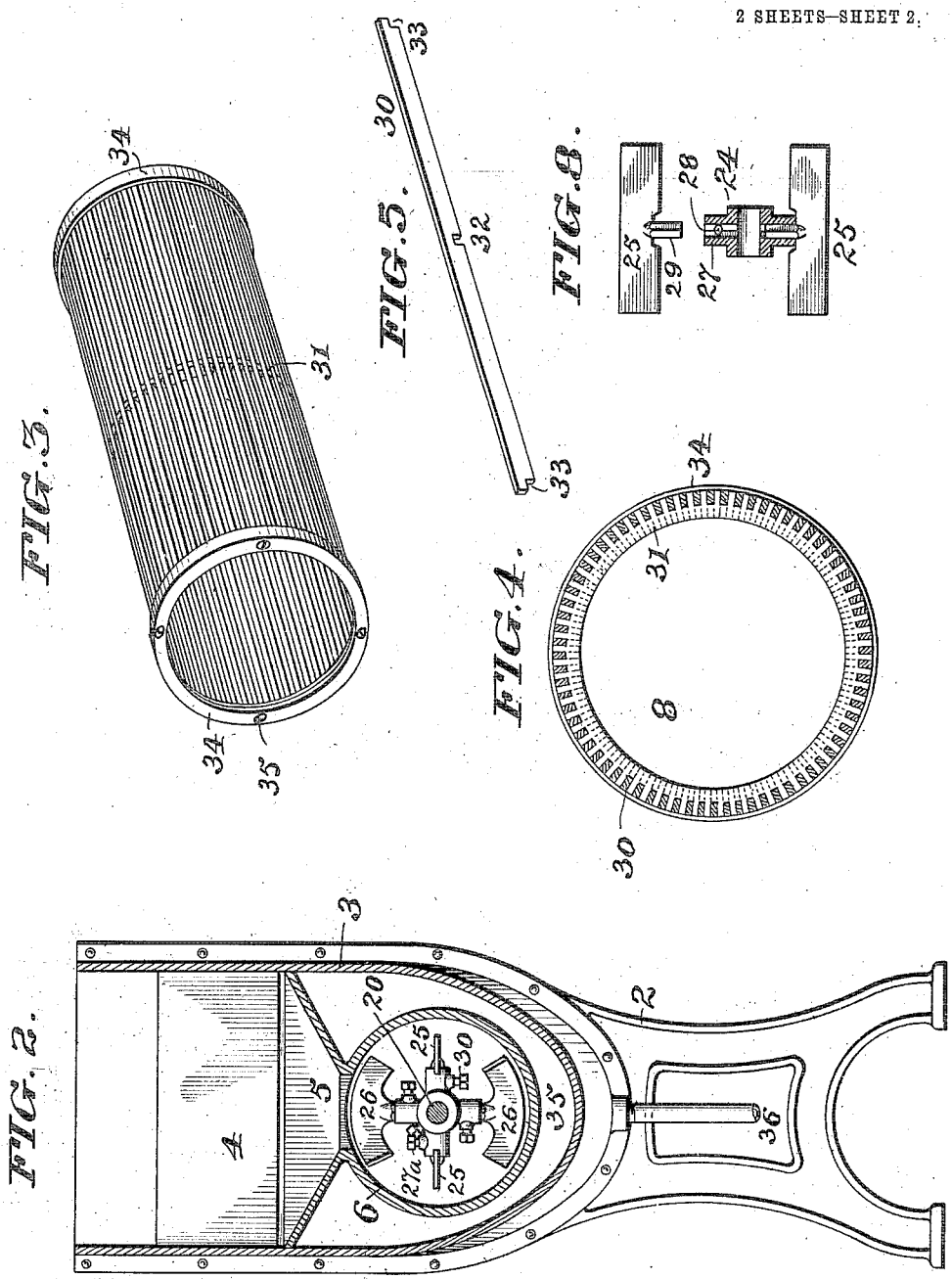

UNITED STATES PATENT OFFICE.

WALTER NORTHROP, OF TORONTO, ONTARIO, CANADA, ASSIGNOR TO EDWARD B. McKAY, OF PHILADELPHIA, PENNSYLVANIA.

FRUIT-CLEANING MACHINE.

1,068,004. Specification of Letters Patent. Patented July 22, 1913.

Application filed February 9, 1911. Serial No. 607,599.

*To all whom it may concern:*

Be it known that I, WALTER NORTHROP, a subject of the King of Great Britain, and resident of Toronto, Province of Ontario, Dominion of Canada, have invented an Improvement in Fruit-Cleaning Machines, of which the following is a specification.

My invention has reference to fruit cleaning machines and consists of certain improvements which are fully set forth in the following specification and shown in the accompanying drawings which form a part thereof.

The object of my invention is to provide a suitable construction of machine which shall be capable of speedily and efficiently cleaning small fruit, such as, currants, raisins, etc., and more particularly for the purpose of removing the stems and dirt from the same.

My improved machine is designed to simultaneously feed and agitate, in a forcible manner, the fruit within a cage or retaining cylinder through the interstices of which the stems and dirt are permitted to escape under the action of centrifugal force and gravity, supplemented by the washing influence of a current of water supplied to the machine and disseminated among the fruit during its passage through the machine. In the operation of my improved machine, the fruit is subjected to a stream of water which thoroughly wets the same and to some extent loosens the dirt. The fruit, together with the washing stream of water, is then fed through a hopper into the cylindrical cage at one end, but in relatively small quantities compared to the cross section or cubical capacity of the said cage, so that the fruit may be freely disturbed and positively treated during the passage through the cage. In the passage of the fruit through the cage, it is subjected to the beating action of beaters, which causes it to be thrown into contact with the cylindrical grate. The agitation thereby produced causes the stem and particles of dirt to be loosened and discharged through the interstices in the grate, said separation being assisted by reason of the presence of the moisture or water which adheres to the fruit and is carried through the grate by the beaters and fruit. Simultaneously with the agitation produced by the beaters, the fruit is subjected to a forward feeding action by oblique blades which perform the function of beaters and conveyers. In this manner, the fruit is thoroughly treated to a beating and washing operation, without being injured or materially abraded and without packing or in any wise interfering with the treatment of each separate part of the fruit.

My invention consists of a machine in which there is employed a longitudinal cylindrical grate in which rotating beater and conveyer portions are arranged and rapidly rotated without contact with the grating, combined with means for washing and delivering the fruit to the cylindrical grating and beaters, and separate means for discharging the fruit from the end of the grating and for conveying the water and materials, cleaned from the fruit and received through the grating, away from the fruit; further, in having the beater and conveyer members detachable and adjustable whereby they may be arranged in certain definite positions relatively one to the other, and which also permit a greater or less number of beater members relative to the number of conveyer members being employed, as desired; further, in certain improvements in the cylindrical grate and its adaptation to the cleaning machine consisting of certain features of construction which permit the ready removal of the grate and the revolving apparatus comprising the beaters and conveyers.

My invention also comprehends details of construction which, together with features above specified, are fully described hereinafter and more particularly defined in the claims.

My invention will be better understood by reference to the drawing in which:—

Figure 1 is a longitudinal sectional elevation of a fruit cleaning machine embodying my invention; Fig. 2 is a cross sectional elevation of the same on line *x—x* of Fig. 1; Fig. 3 is a perspective view of the cylindrical grate removed; Fig. 4 is a cross section of the cylindrical grate; Fig. 5 is a perspective view of one of the bars of the cylindrical grate; Fig. 6 is a perspective view of one of the end plates of the cylindrical grate; Fig. 7 is an end view of a portion of my improved machine with a portion broken away; and Fig. 8 is a general view with part in section illustrating the manner of supporting and attaching the beaters.

2, 2 are end frames, and 3 is a U-shaped intermediate body frame bolted to the end frames. The lower part of the body is slightly inclined toward one end, from which a drainage pipe 36 may extend. In the upper portion of the body and extending between the sides, is an inclined floor 4 upon which the fruit to be treated is placed and subjected to a washing operation by water from a spigot 37, which discharges into the machine at the higher end of the floor 4. The water, which acts upon the fruit for cleansing purposes, flows downward together with the dirt and passes into a hopper 5 which opens at its lower part into a cylindrical frame 6 bolted to the end frame 2. The surplus water, carrying more or less of the dirt, flows from the cylinder 6 into the cylindrical grating 8 and escapes through the interstices therein and finds its way into the lower chamber 35 and thence passes down the inclined bottom into the drain pipe 36. During this operation of washing, the fruit is also delivered to the hopper 5 and thence into that portion of the machine in which it is subjected to treatment for removing the stems and such additional dirt as may adhere to it.

I will now describe the particular mechanism for treating the fruit.

A cylindrical grating 8 is clamped between the flanged end 7 of the cylinder 6 and the flanged end 10 of a head 9 which is detachably bolted to the discharge end of the machine and more specifically to the end frame 2 thereof, by means of bolts 14 having wing nuts. This head 9 is provided at its center with a bearing 12 and at its lower part with an aperture 11 through which the fruit may be discharged. Within the cylindrical cage 8 is arranged a rotatable shaft 20, which is provided with beater and conveyer blades. The shaft 20 is journaled in the bearing 12 at the discharge end and is also journaled in a bearing 21 on the end frame 2 at the opposite end of the machine and is held against longitudinal movement by collars 23, the outer one of which may be removable so as to be able to withdraw the shaft 20, together with its beater and conveyer devices, through the opening made by the removal of the head 9, when desired. Upon the outer end of the shaft 20 are arranged fast and loose driving mechanism 22. Secured upon the shaft 20 are a plurality of hubs 24 having radial parts 27 provided with radial holes 28 which are polygonal in cross section. I prefer to provide four of these radial holes to each hub. 25 are beaters and consist of longitudinal blades having laterally extending shanks 29 of a cross section corresponding to the polygonal holes 28 so that it is adapted to fit down into the hole in only a certain definite position and is secured therein by set screws 27ª. The polygonal shaped holes and shanks may be more specifically described as presenting a square cross section so that these blades 25 can only be put into the machine in one definite position, namely, one which is parallel to the shaft. 26 represent oblique or spiral shaped beaters and which at the same time act as conveyers, and these, like the beaters 25, are provided with similar polygonal shaped shanks 29 adapted to fit into the same holes 28 of the hubs and to be clamped by set screws, in a similar manner. As will be observed, by reference to Figs. 1 and 2, I prefer to provide each of the hubs 24 with two of the straight beaters 25 and two of the oblique conveying beaters 26 so that every portion of the length of this rotating mechanism has a tendency to feed as well as to beat the fruit. The beaters 25 and 26 are maintained at some distance from the interior surface of the cylindrical grate so as not to injure the fruit by crushing it.

The cylindrical cage 8 is more fully shown in Figs. 3 to 6 inclusive and consists of a plurality of bars 30 notched in the middle at 32 and at the ends at 33, and said bars arranged at intervals about a middle ring 31 and two similar end rings, said rings being notched so as to receive and coöperate with the notched portions 32 and 33 of the bars. The bars are held against spreading by means of the flanged rings 34 fitted over each end and secured in position by screws 35. This cage forms a continuous internal guide surface formed of parallel bars preferably having rectangular corners. The cylindrical casing so formed is sustained, as before stated, between the flanges 7 and 10, and when desired may be readily withdrawn by removing the head 9, together with the discharge chute 16 and its hood 19.

It will be understood that the beater shaft 20 being provided with a plurality of sections of beaters and conveyers, permits these parts to be made and applied in a manner which is inexpensive and capable of independent radial adjustment when necessary to suit the different character of fruit to be treated. Furthermore, where it is desired that the fruit shall be subjected to greater beating action in a given time, some of the conveyer blades 26 may be substituted by beater blades 25 and in that way reduce the speed of the travel of the fruit through the machine. On the other hand, in some cases, where a greater speed of operation is required, some of the beaters 25 may be replaced by conveyer beaters 26. It is seen that this beating and conveying mechanism is capable of great variation as to its operation on the fruit, but in any case the construction is such that the beating and conveying blades must be put into proper position by reason of the fact that the sockets or holes 28 and the shanks 29 are so shaped as to prevent the parts being placed in wrong positions before being inserted into the machine. This is important, in view of the fact that, while provision must be given to the operator to change the capacity of his machine to suit the class of work required of it, the said operator should not have any liberty in making the substitution of blades that would allow any blade to strike the grating, as would be the case if the shanks and holes were round. Should such a defective adjustment occur, it would either break the blade as well as injure the grating, or would bend the shaft. My present improvement will prevent any possibility of such defects occurring, even at the hands of the most ignorant persons.

At the discharge end of the machine, I provide a discharge chute 16 which is bolted to the end frame by bolts 17. This discharge chute is provided with a hood 19 over its upper portion and the upper portion of the said hood is bolted to the head 9 by bolts 17ª. The chute 16 is provided with an upwardly extending projection 18 back of which a lug 15, on the lower part of the head 9, may extend for the purpose of holding the said head in position at its bottom, whereas at its top it is held by the wing bolts 14 extending through slotted lugs 13. The slots in these lugs are so arranged that a slight rotation of the head 9 may be had for the purpose of freeing the lug 15 of the head from the retaining projection 18 of the chute whenever it is desired to withdraw the head and the bearing 12 from the end frame of the machine, for removing the grating or the beater shaft.

In the operation of this machine, the fruit in its wet condition is delivered into the cylindrical part 6 and acted upon by the conveyers 26, so as to be propelled into the grating cylinder 8 where it is subjected to the combined beating and feeding operations of the beaters and conveyers. It is agitated with considerable force, whereby it is thrown against the interior walls of the grating with the result of loosening the stems and disengaging any dirt particles, which pass between the grating bars and into the chamber 35. The beating operation upon the wet fruit thoroughly removes all of the objectionable parts therefrom and gives to the fruit a clean natural color which is highly desirable. Only enough fruit is fed through the machine at any time as will permit the free disturbance of it without any danger to its packing or becoming crushed, as the successful operation of the machine depends largely upon the freedom with which the fruit is struck and agitated in the space within the grating, the said agitation and impact of the fruit with the beaters and the grating being the act which insures the removal of the stems and adhering dirt and imparts the polish to the fruit.

I have shown my improvements in the form which I have found excellently adapted for commercial usage, and while I prefer the said constructions, I do not restrict myself to the details shown, as these may be modified in various ways without departing from the spirit of the invention.

Having now described my invention what I claim as new and desire to secure by Letters Patent, is:—

1. In a fruit cleaning machine, the combination of a cylindrical grating having longitudinal slits throughout its length and said slits extending throughout its circumference, a rotating shaft arranged within the grating and provided longitudinally with sets of beaters each set comprising a plurality of beaters arranged in the same circumferential plane so as each to traverse the same portions of the grating, said beaters formed as blades supported at a distance from the shaft and a portion of the beaters of each set arranged obliquely to the axis of rotation of the shaft, and the remainder of the beaters rigidly fixed to and parallel to the shaft, means for delivering the materials to one end of the cylindrical grating and causing its discharge from the other end, and a surrounding chamber inclosing the grating and independent of the means for delivering the materials to or their discharge from the grating.

2. In a fruit cleaning machine, the combination of a cylindrical grating having longitudinal slits throughout its length, a rotating shaft within the grating and provided with a series of sets of beaters arranged along its length and each set comprising a plurality of beaters arranged in the same portion and traversing the same part thereof, a portion of said beaters being arranged longitudinally parallel to the axis of the shaft and the remaining portion of the beaters of each set arranged obliquely to the axis of rotation of the shaft for conveying the fruit through the cylindrical grating and the said beaters being at all times held at a considerable distance from the interior surface of the grating so as to form a free passage for the fruit between them and the grating, and means for delivering the fruit to one end of the cylindrical grating and permitting its discharge from the other end thereof.

3. In a fruit cleaning machine, the combination of a cylindrical grating, and a rotating shaft arranged within the grating and provided longitudinally at intervals with a plurality of sets of beaters, a portion of which sets of beaters are arranged in fixed obliquity to the axis of rotation of the shaft for conveying the fruit through the cylindrical grating and the remaining portion being arranged parallel to the axis of rotation of the shaft and said beaters being secured to the shaft by independent adjusting means for separately supporting and radially adjusting each of the beaters upon the rotating shaft, in the same diametrical line.

4. In a fruit cleaning machine, the combination of a cylindrical grating, and a rotating shaft arranged within the grate and provided longitudinally at intervals with a plurality of sets of removable beaters circumferentially arranged, a portion of which beaters are arranged obliquely to the axis of rotation of the shaft for conveying the fruit through the cylindrical grating, the connections between the beaters and shaft consisting of a shank on one part fitting a hole in the other part said shank and hole being irregular in cross section so that they only fit in definite positions, and clamping devices for holding them in fixed relation, whereby part of the beaters can only be set substantially parallel to the axis of the shaft and others of the beaters only arranged obliquely to the axis of the shaft.

In testimony of which invention, I hereunto set my hand.

WALTER NORTHROP.

Witnesses:
R. M. Hunter,
R. M. Kelly.